Nov. 7, 1950     W. W. DETRICK     2,529,246
LATERAL DRILL
Filed Aug. 16, 1947
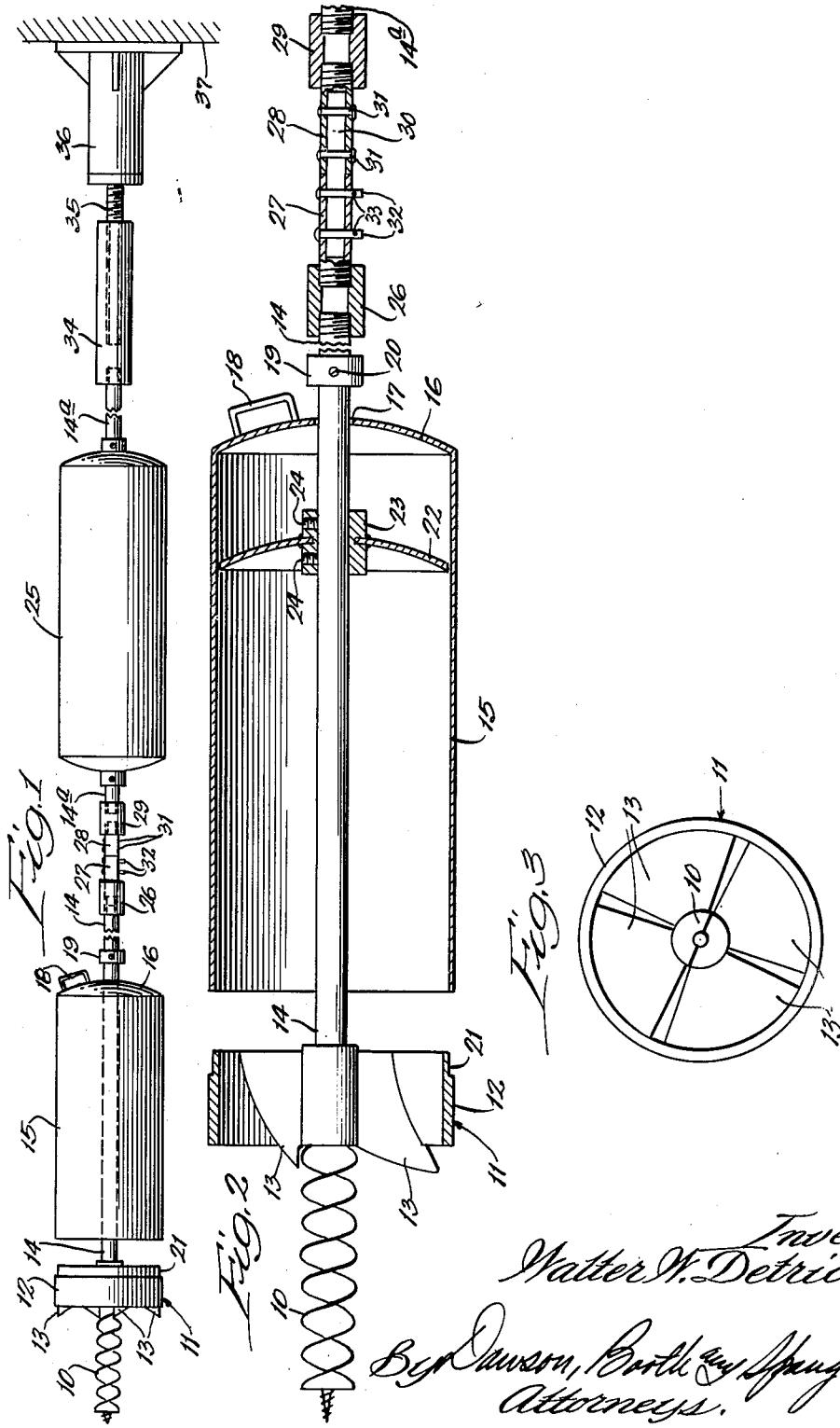
Inventor:
Walter W. Detrick,
By Dawson, Barth & Spangenberg,
Attorneys.

Patented Nov. 7, 1950

2,529,246

UNITED STATES PATENT OFFICE 2,529,246

LATERAL DRILL

Walter W. Detrick, Quincy, Ill.

Application August 16, 1947, Serial No. 769,054

7 Claims. (Cl. 255—20)

This invention relates to a lateral drill. The invention is particularly useful in the forming of a cylindrical passage or hole in a generally horizontal plane as, for example, in forming a passage for a pipe leading from the basement of a house to the sewer in the street.

An object of the invention is to provide simple and effective apparatus which may be employed for cutting a passage in a generally horizontal direction and in other directions. Another object is to provide apparatus which is adaptable for the cutting of holes or passages of varying lengths, additional sections being employed as needed. Yet, another object is to provide apparatus of extremely simple structure, which is highly effective in cutting pipe passages and the like while using a minimum of equipment. Other specific objects and advantages will appear as the specification proceeds.

The invention is illustrated, in a preferred embodiment, by the accompanying drawing, in which—

Figure 1 is a broken side view in elevation of apparatus embodying my invention; Fig. 2, a broken enlarged sectional view; and Fig. 3, a front view in elevation.

In the illustration given, 10 designates an augur which may be of any suitable type or form. The augur is supported within a cutter 11, which may also be of any suitable type or construction. The cutter 11 comprises a cylindrical casing 12 equipped interiorly with the cutter plates 13. Fixed to the rear end of the cutter and augur structure is a hollow pipe 14. If desired, the cutter and augur structure may be apertured to permit the flow of water from pipe 14 into the cylindrical casing 12.

Slideably and non-rotatably mounted upon the pipe 14 is a cylinder or can 15. The can 15 is provided with a rear closed wall 16 apertured at 17 to receive the pipe 14. The aperture 17 provides a bearing for the pipe 14 so as to keep it centered within the passage which is being cut. A handle 18, for moving the can 15 longitudinally, is secured to the rear wall 16. A collar 19 equipped with a set screw 20 is employed for locking the can 15 in its forward position.

The can 15, in its forward position, is received within a recessed portion 21 of the cylinder 12 and forms therewith a smooth connection. When the can 15 is in its forward position and engaging the recessed portion 21, the outer surface of the can is substantially flush with the outer surface of the unrecessed portion of the cylindrical wall 12. As stated above, the collar 19 is employed for holding the forward end of the can in engagement with the recess 21.

Within the can or cylinder 15 is a clean-out plate 22, which may be of any suitable shape or contour. In the illustration given, the plate 22 is dished and the inner end of the plate is received within a slideable collar 23. The collar 23 is clamped to the pipe 14 by set screws 24. Thus, the hub 23 remains fixed to the pipe 14 and rotates within the non-rotatable can or cylinder 15.

To the rear of the cylinder 15 is another cylinder 25. The cylinder 25 is also non-rotatable and is freely mounted upon a pipe section 14ª.

Any suitable means may be employed for connecting the pipe sections 14 and 14ª. In the specific illustration given, I provide a quickly disconnecting coupling arrangement, which consists of the following parts: As shown more clearly in Fig. 2, the pipe 14 is threaded into a coupling 26, and a pipe segment 27 is threadedly connected to the other end thereof. Similarly, another pipe segment 28 is threadedly connected to the coupling 29 and to the opposite end is threadedly connected pipe 14ª. An attachment bar 30 connects the two pipe sections 27 and 28. The bar on one side is connected by the bolts 31, and on the other side, by the removable bolts 32. The removable bolts 32 are provided with transverse openings receiving pins 33 on their underside. For a quick disconnection, the pins 33 may be withdrawn and the bolts 32 lifted out. Similarly, the two pipes may be joined in this manner for a quick connection.

The cylinder or can 25 may be exactly the same as cylinder 15 or, if desired, the cylinder may be provided with heads having hubs freely receiving the pipe 14ª. It will be understood that a large number of cylinders 25, with their corresponding pipe sections, will be employed in the forming of a relatively long passage through the earth, the successive cylinders and pipe sections being added as the passage becomes longer. In this way, successive bearings will be provided for the long length of pipe formed by uniting the sections, and such pipe will be accurately centered throughout. Rotatably mounted on the rear end of the rearmost pipe section is a tube 34 having a threaded pipe therein receiving the screw 35. The screw 35 is fixed to an abutment member 36 which engages a wall 37 of the basement from which the passage is being cut. It will be understood that the member 36 may engage any object which provides a stationary support.

Operation

In the operation of the apparatus, the pipe 14, or any subsequent section 14ª, is rotated by means of a pipe wrench or other means. At the same time, the tube 34 is rotated so as to exert forward pressure against the pipe section. Thus, the cutter is held against rearward movement by the pipe and the members 34, 35, 36 and 37, while the pipe 14 is rotated. The rotation of the augur and cutter causes clay and other material cut thereby to be fed rearwardly into the interior of the cylinder 15 where it packs against the clean-out plate 22. When the can 15 is filled, the pipe is drawn rearwardly out of the passage and the collar 19 loosened and slid back on the pipe. The handle 18 is grasped and the can 15 drawn back so as to force the clay, etc. out of the can and against the fixed clean-out plate 22.

As the passage becomes longer, new pipe sections are added, each being preferably equipped with a can 25, which is non-rotatable and permits the free rotation of the pipe section therein, holding the pipe in centered position within the passage. Thus, an extremely long passage can be cut with relatively little apparatus and the passage remains true by reason of the use of the cans 25 at fixed intervals. Collars, or other means, may be provided with each of the cans for holding them in any desired positions, while permitting the pipe sections to rotate freely therein.

While in the foregoing specification, I have set forth certain structures in great detail for the purpose of illustrating the same in one embodiment of the invention, it will be understood that such details may be varied widely by those skilled in the art without departing from the spirit of my invention.

I claim:

1. In a horizontal hole digger, a pipe, a cutter fixed to the forward end thereof, a cutter having a cylindrical frame with a recessed rear portion, a cylinder having a bearing freely receiving said pipe and having a front edge received within said recess to form a smooth continuation of said cylindrical frame, means releasably fixed to said pipe for holding said cylinder, with the forward end thereof received within said recess, and a clean-out plate fixed to said pipe and substantially closing the rear portion of said cylinder.

2. In a horizontal hole digger, a pipe, cutting means fixed to the forward end thereof, a cylindrical frame enclosing said cutter means, a can open at its forward end and having a rear wall apertured to provide a bearing receiving said pipe, a collar releasably fixed to said pipe for holding said can, with the forward end thereof engaging said cylindrical frame, a clean-out plate fixed to said pipe and substantially closing the rear portion of said can, and a handle fixed to the rear wall of said can and extending rearwardly in longitudinal alignment therewith.

3. In a horizontal hole digger, a plurality of pipe sections connected for quick release thereof and for rotation when connected, a cutter fixed to the forward end of the pipe, means for rotating the pipe sections together, a plurality of non-rotating cans in spaced-apart relation having at least the rear walls thereof apertured to provide bearings freely receiving said pipe sections, the foremost can being open at its forward end for receiving material from said cutter, a clean-out plate fixed to said pipe and substantially closing the rear portion of said foremost cylinder, and an abutment member equipped with rotatable means for advancing said pipe sections.

4. In a lateral drill, a plurality of pipe sections connected for quick release thereof and for rotation when connected, a cutter fixed to the forward end of the pipe, means for rotating the pipe sections together, a plurality of non-rotating cans in spaced-apart relation having at least the rear walls thereof apertured to provide bearings freely receiving said pipe sections, the foremost can being open at its forward end for receiving material from said cutter, a clean-out plate fixed to said pipe and substantially closing the rear portion of said foremost cylinder, and an abutment member equipped with rotatable means for advancing said pipe sections, said abutment member comprising a fixed member adapted to engage a wall and equipped with a screw, and a rotatable member having a socket receiving the end of a pipe section and a threaded recess receiving said screw.

5. In horizontal digger apparatus, a plurality of pipe sections releasably connected together for rotation, a cutter at the forward end of the pipe, means for rotating the pipe sections, non-rotating cylinders carried by said sections in spaced-apart relation, each cylinder being provided with a bearing freely receiving a pipe section, abutments fixed to said pipes for advancing said cylinders, the foremost cylinder being open at its forward end for receiving material from said cutter, and a clean-out plate fixed to said pipe section and substantially closing the rear portion of said foremost cylinder.

6. In horizontal digger apparatus, a plurality of pipe sections releasably connected together for rotation, a cutter at the forward end of the pipe, means for rotating the pipe sections, non-rotating cylinders carried by said sections in spaced-apart relation, each cylinder being provided with a bearing freely receiving a pipe section, adjustable abutments fixed to said pipes for advancing said cylinders, the foremost cylinder being open at its forward end for receiving material from said cutter, and a clean-out plate adjustably fixed to said pipe and substantially closing the rear portion of said foremost cylinder.

7. In horizontal digger apparatus, a plurality of pipe sections releasably connected together for rotation, a cutter at the forward end of the pipe, means for rotating the pipe sections, non-rotating cylinders carried by said sections in spaced-apart relation, each cylinder being provided with a bearing freely receiving a pipe section, adjustable abutments fixed to said pipes for advancing said cylinders, the foremost cylinder being open at its forward end for receiving material from said cutter, and a clean-out plate adjustably fixed to said pipe and substantially closing the rear portion of said foremost cylinder, said foremost cylinder being equipped at its rear wall with a handle for drawing the cylinder rearwardly along the pipe.

WALTER W. DETRICK.

REFERENCES CITED

The following references are of record in the file of this patent:

UNITED STATES PATENTS

| Number | Name | Date |
|---|---|---|
| 24,749 | Mahen | July 12, 1859 |
| 183,467 | Pierce | Oct. 17, 1876 |
| 238,888 | Gould | Mar. 15, 1881 |
| 619,675 | Cram | Feb. 14, 1899 |
| 938,970 | Carlson | Nov. 2, 1909 |
| 1,932,068 | Englebright et al. | Oct. 24, 1933 |
| 1,993,366 | Englebright | Mar. 5, 1935 |
| 2,234,451 | Ransome | Mar. 11, 1941 |